US007255061B2

(12) United States Patent
Denton

(10) Patent No.: US 7,255,061 B2
(45) Date of Patent: Aug. 14, 2007

(54) CONTROL KNOB WITH SYMBOL DISPLAY

(75) Inventor: Douglas Denton, Alafors (SE)

(73) Assignee: Gm Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/392,038

(22) Filed: Mar. 29, 2006

(65) Prior Publication Data

US 2006/0219156 A1 Oct. 5, 2006

(30) Foreign Application Priority Data

Mar. 30, 2005 (SE) .................................... 0500692

(51) Int. Cl.
*G09F 9/00* (2006.01)
*G01D 11/28* (2006.01)

(52) U.S. Cl. ....................... 116/310; 116/309; 116/286; 362/23; 362/29; 200/316

(58) Field of Classification Search ................ 116/310, 116/305, 306, 309, 316, 318, 277, 284, 286, 116/298, 299, 42, 43, 45, 46; 362/23, 26, 362/28, 29, 30; 200/310, 313, 316
See application file for complete search history.

(56) References Cited

U.S. PATENT DOCUMENTS 2,334,479 A * 11/1943 Creager ...................... 116/310
2,681,634 A * 6/1954 Polley ........................ 116/246
2,693,165 A * 11/1954 Appleman .................. 116/310
2,885,992 A * 5/1959 Roberts et al. ............. 116/257
3,404,657 A * 10/1968 Zmuda ....................... 116/309
3,619,591 A * 11/1971 Korski ....................... 362/560
3,619,594 A * 11/1971 Morez ........................ 362/140
3,636,915 A * 1/1972 Ruppert ...................... 116/337
5,335,148 A * 8/1994 Tominaga .................... 362/26
6,178,916 B1 * 1/2001 Snider ........................ 116/284
6,348,772 B1 * 2/2002 May ........................... 318/430
6,744,374 B1 * 6/2004 Kuenzner ............. 340/815.78

FOREIGN PATENT DOCUMENTS

DE 87 02 558 U 2/1987
GB 2 376 284 A 12/2002

* cited by examiner

*Primary Examiner*—Diego Gutierrez
*Assistant Examiner*—Am R. Cohen
(74) *Attorney, Agent, or Firm*—Ostrolenk, Faber, Gerb & Soffen, LLP

(57) ABSTRACT

Control, comprising a knob (12*a*) with a prism (20) that has an axial part (22) located centrally in the knob, with a symbol display surface (28) at an external end (30) of the knob, and a part (24) arranged at an angle to the central part for receiving incident light from a symbol illuminated by a light source (34), which symbol is on a stationary disc element (32) located at an end of the knob (12*a*) facing away from the external end (30) and concentric with this, in order to be able to display different symbols by optical projection towards the symbol display surface (28) depending upon the rotational position of the knob (12*a*).

7 Claims, 2 Drawing Sheets

CONTROL KNOB WITH SYMBOL DISPLAY

TECHNICAL FIELD

The present invention relates to a control of the type that comprises a knob intended to be mounted in a wall element in such a way that it can rotate, with an external end facing towards the user and with a central cavity for housing a light-transmitting medium, in order to be able to display different symbols, depending upon the rotational position of the knob, by optical projection towards the external end, in addition to which the control comprises a disc element upon which symbols are arranged that are to be displayed at the external end of the knob, which disc element is located at the end of the knob facing away from the external end and concentric with this, and a light source that is located on the side of the disc element facing away from the knob and is intended to illuminate the symbol on the disc element that is to be displayed at the external end of the knob at the time. Such controls can be used, for example, in motor vehicles in order to indicate clearly information that is relevant to a driver and passengers in the middle of the knob, both in daylight and in dark conditions.

BACKGROUND ART

A control of this type for indicating centrally on a knob for example a selected temperature, a distribution of air or a fan speed in an air-conditioning system is already known, through for example GB 2 376 284 A. The knob in this control comprises a transparent disc, upon which the symbols are arranged, that is fixed concentrically on an inner end of the knob, and a magnification lens positioned centrally in the knob, that can display a relevant illuminated symbol on the disc at an external end of the knob. The knob thus consists of three parts, with the lens constituting a relatively large part, as far as volume is concerned, for magnifying the symbols at the external end of the knob. This design also requires the knob to have a relatively large dimension in its radial direction.

DISCLOSURE OF INVENTION

An object of the present invention is to propose a control in which the knob makes it possible to project an illuminated symbol towards the centre of the knob utilizing a small number of components and in which the knob retains a relatively short extent in its radial direction. For this purpose, the control according to the invention that is described in the introduction is characterized by the characteristics that are stated in the characterizing part of the following claim 1.

According to another aspect of the invention, a control is proposed in which the knob makes it possible to project an illuminated symbol towards the centre of the knob utilizing a small number of components and in which the knob has a relatively short axial extent. For this purpose, the control according to the invention is characterized by the characteristics that are stated in the following independent claim 4.

According to yet another aspect of the invention, in accordance with the independent claim 7, it is possible to design the control in such a way that the prism itself is designed as a knob with a part that can be held, which knob has a surface that prevents the leakage of light between the internal and external ends of the prism, so that the prism does not have a surrounding casing. By this means, the control can be made much narrower.

Additional characteristics and components of the control according to the present invention are apparent from the subsidiary claims and from the following detailed description, with reference to the attached drawings.

MODES(S) FOR CARRYING OUT THE INVENTION

Figure 1:
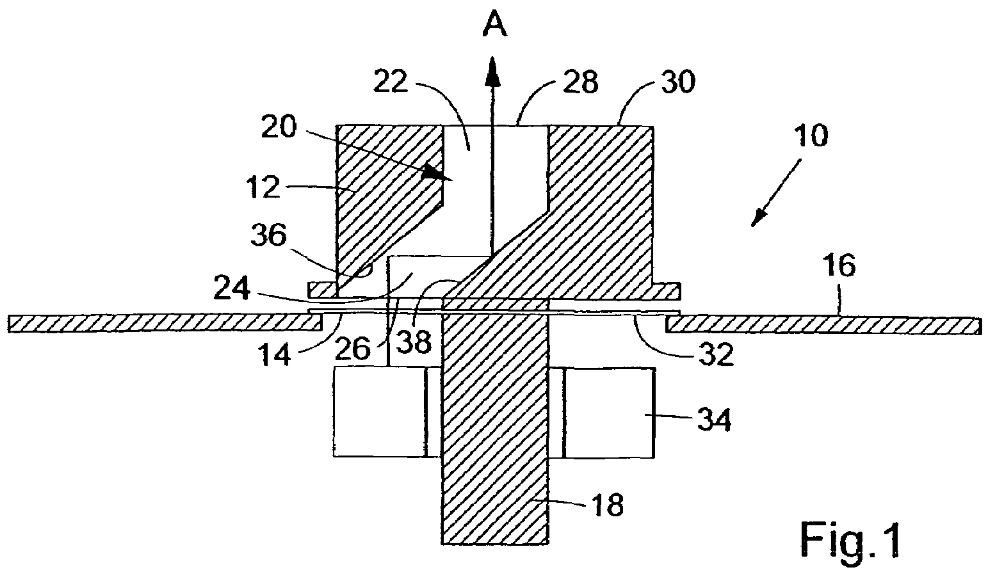
FIG. 1 is a schematic side view of a first embodiment of a control according to the present invention.

FIG. 1 shows a first embodiment of a control 10 according to the present invention. The control 10 comprises a cylindrical knob 12, intended to be mounted by means of a spindle 18, in a way that is not shown in greater detail, in an opening 14 in a wall element 16, for example a dashboard in a motor vehicle, in such a way that it can rotate. The knob 12 has a cavity containing a light-refracting prism 20. The prism 20 has a central axial part 22 and a part 24 connected to this at an angle of 45°, with a light intake opening 26 that is parallel to a symbol display surface 28 of the prism 20 at an external end surface 30 of the knob 12. A disc element 32 that is provided with symbols is mounted over the opening 14 in the wall element 16 in such a way that it is stationary. The symbols can, for example, consist of numbers (see FIG. 3) that indicate required temperature values, fan speed, etc., in an air-conditioning system. These symbols are illuminated from below in FIG. 1 by a light source 34 that is mounted in such a way that it is stationary, which light source can, for example, consist of a ring surrounding the spindle 18 of the knob concentrically, to which light from a remote light-emitting diode can be led via a light guide (not shown) in a known way. If required, a single lamp that rotates with the spindle 18 can replace the light ring 34 for illuminating from below the symbol that the prism 20 is to project up towards the display surface 28 at the time. As shown by the arrow A in FIG. 1, depending upon the rotational position of the knob 12 that has been set, the relevant light image (the symbol) is projected as in a periscope, first towards the left at the surface 36 of the prism 20 that is inclined at 45°, where it is reflected through 90° towards the right at the surface 38 that is inclined at 45°, and is then refracted through 90° up towards the display surface 28, where it can be read off by the driver and/or the passengers.

Figure 2:
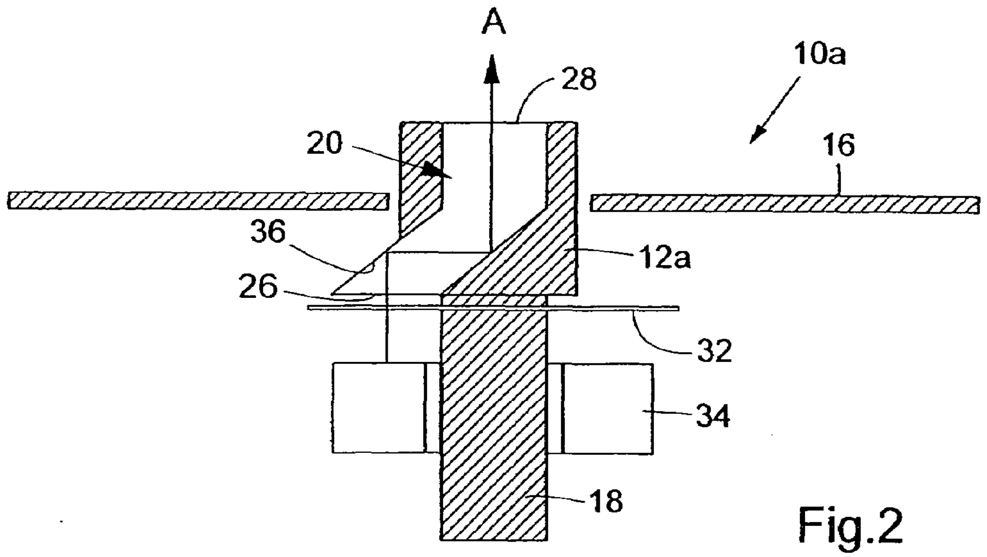
FIG. 2 is a schematic side view of a slightly modified embodiment of the control in FIG. 1.
Figure 3:
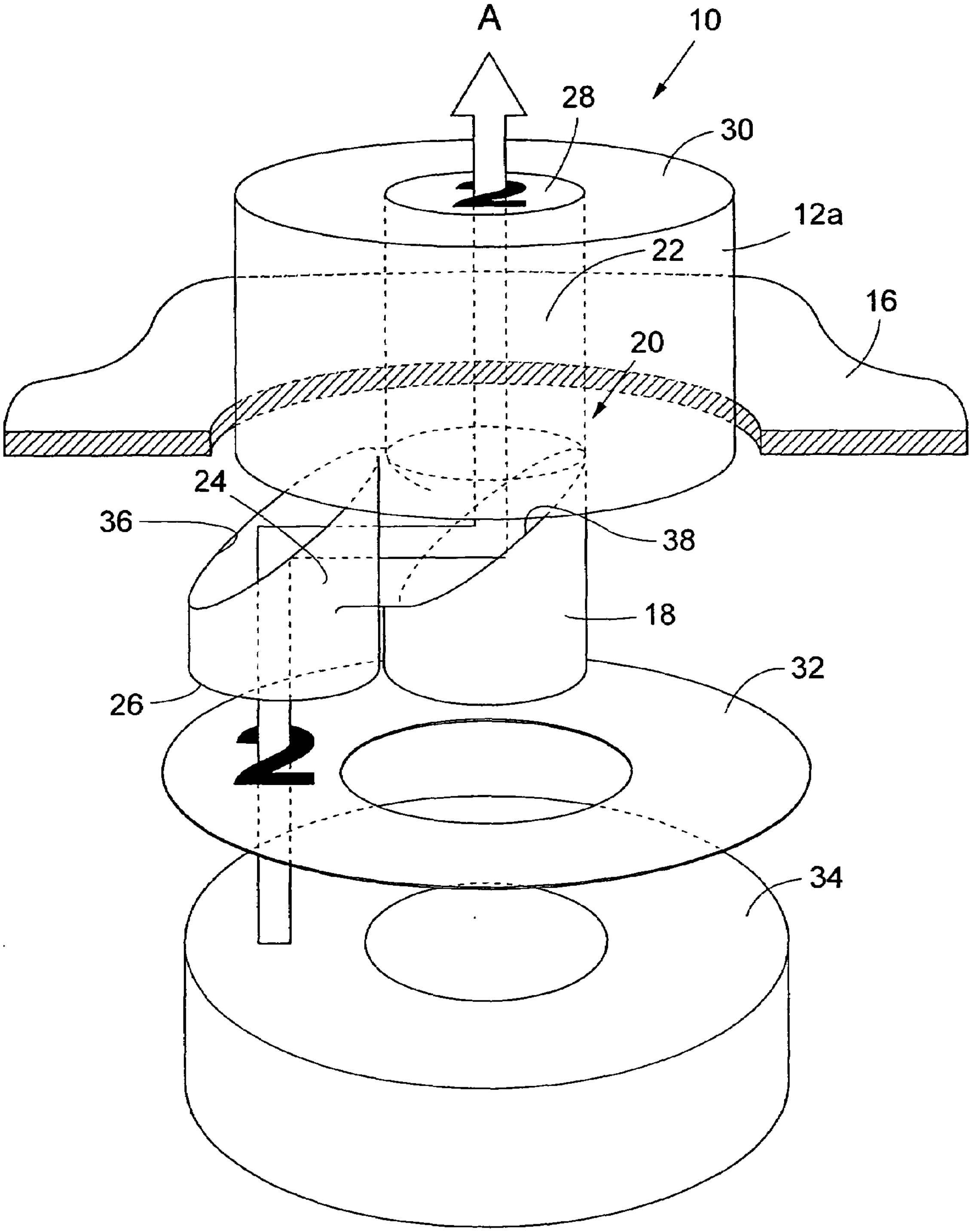
FIG. 3 is a schematic exploded perspective view of the embodiment in FIG. 2.

FIGS. 2 and 3 show a control 10*a* that is slightly modified in relation to the control in FIG. 1, in which one of its advantages can be seen more clearly, namely the fact that it is possible to produce a relatively narrow version of the knob 12*a* as a result of the periscope-like embodiment of the prism 20*a* that it contains. In this embodiment, the knob 12*a* has thus a narrower configuration and is recessed into the opening 14 in the wall element 16, with the disc element 32 with the symbols being mounted below the wall element 16 in such way that it is stationary. The exploded view in FIG. 3 shows clearly how the knob 12*a* projects up the number "2" onto the display surface 28 in the centre of the knob when it is in the rotational position that has been set.

Figure 4:
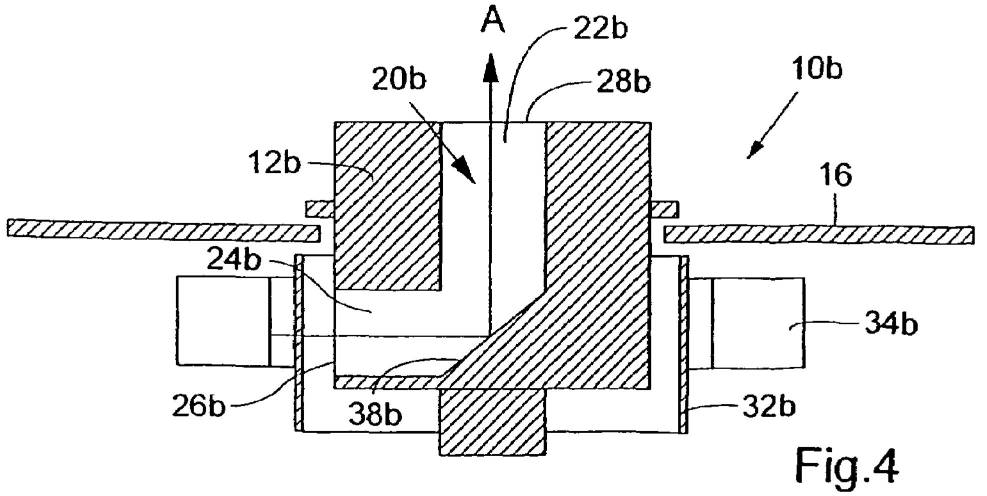
FIG. 4 is a schematic side view of an additional embodiment of the control according to the invention.

FIG. 4 shows an embodiment of a control 10*b*, which makes it possible to produce a control that is shorter in its axial direction. For this purpose, the knob 12*b* has a prism 20*b* with an axial central part 22*b* and a part 24*b* connected transversely to this, which part 24*b* has a light intake opening 26*b* that is oriented at 90° in relation to a symbol display surface 28*b* on the prism 20*b*. A disc element with symbols is here in the form of a stationary cylindrical casing 32*b* that concentrically surrounds a part of the knob 12*b* that contains the angled part 24*b* of the prism 20*b*. A light source 34*b* is arranged to illuminate the symbol on the stationary disc element 32*b* that is to be displayed on the display surface 28*b*, independent of the rotational position of the knob. The light source 34*b* is preferably in the shape of a ring that surrounds the cylindrical casing 32*b* and has a central axis that is concentric with the rotational axis of the knob 12*b*. In this embodiment, the light image from the illuminated symbol on the disc element 32*b* is refracted once through 90° at the surface 38*b* and is projected up to the display surface 28*b*.

In the embodiments described above, prisms have been shown with one or two light refractions through an angle of 90° before the light image reaches the display surface 28, 28*b*. Within the framework of the invention, it is possible to vary the prism optics in such a way that this angle can be other than precisely 90° but in such a way that the symbol will still be clearly visible at or through the display surface 28, 28*b* and in such a way that the control has compact dimensions. It is also possible to design the control in such a way that the knob and the prism are integrated in such a way that the prism also forms the actual knob. For this purpose, the prism can have a suitable layer on the outside that prevents the leakage of light and the prism can also be designed in such a way that it is easy to hold.

The invention claimed is:

1. Control, comprising a knob (12;12*a*) intended to be mounted in a wall element (16) in such a way that it can rotate, with an external end (30) facing towards the user and with a central cavity for housing a light-transmitting medium in order to be able to display different symbols, depending upon the rotational position of the knob, by optical projection towards the external end, in addition to which the control (10; 10*a*) comprises a disc element (32) upon which symbols are arranged that are to be displayed at the external end (30) of the knob (12; 12*a*), which disc element is located at the end of the knob (12; 12*a*) facing away from the external end (30) and concentric with this, and a light source (34) that is located on the side of the disc element (32) facing away from the knob (12; 12*a*) in order to illuminate the symbol on the disc element that is to be displayed at the external end of the knob at the time, characterized in that the disc element (32) upon which the symbols are arranged is stationary, in that the light-transmitting medium that is in the cavity comprises a prism (20), comprising an axial part (22) that is central in the knob (12;12*a*) with a symbol display surface (28) at the external end of the knob, and a part (24) that is arranged at an angle to the central part (22) for receiving incident light from the illuminated symbol on the disc element (32) that is to be projected on the display surface (28) at the time and refracting this incident light towards the display surface, and in that the light source (34) is arranged to illuminate the symbol on the stationary disc element (32) that is to be displayed on the display surface (28) at the time, independent of the rotational position of the knob (12; 12*a*).

2. Control according to claim 1, characterized in that the prism (20) has two reflecting surfaces (36, 38) inclined at an angle of approx. 45° in relation to the rotational axis of the knob, for refracting light that incides parallel to the axis of the prism twice through approx. 90° and directing it towards the display surface (28).

3. Control according to claim 1, characterized in that the light source is in the form of a ring (34) with its central axis concentric with the rotational axis of the knob (12; 12*a*).

4. Control, comprising a knob (12*b*) intended to be mounted in a wall element (16) in such a way that it can rotate, with an external end (30*b*) facing towards the user and with a central cavity for housing a light-transmitting medium in order to be able to display different symbols, depending upon the rotational position of the knob (12*b*), by optical projection towards the external end, in addition to which the control (10*b*) comprises a disc element (32*b*) upon which symbols are arranged that are to be displayed at the external end of the knob (12*b*), which disc element is concentric with the knob, and a light source (34*b*) that is located on the side of the disc element (32*b*) facing away from the knob (12*b*) in order to illuminate the symbol on the disc element that is to be displayed at the external end of the knob at the time, characterized in that the light-transmitting medium that is in the cavity comprises a prism (20*b*), comprising an axial part (22*b*) that is central in the knob (12*b*) with a symbol display surface (28*b*) at the external end of the knob, and a part (24*b*) that is arranged at an angle to the central part for receiving incident light from the illuminated symbol on the disc element (32*b*) that is to be projected on the display surface (28*b*) at the time and refracting this incident light towards the display surface, and in that the disc element upon which the symbols are arranged is designed as a stationary cylindrical casing (32*b*) that surrounds concentrically a part of the knob (12*b*) that contains the angled part (24*b*) of the prism, and in that the light source (34*b*) is arranged to illuminate the symbol on the stationary disc element (32*b*) that is to be displayed on the display surface (28*b*) independent of the rotational position of the knob (12*b*).

5. Control according to claim 4, characterized in that the prism (20*b*) has a single reflective surface (38*b*) inclined at approx. 45° to the rotational axis of the knob, for refracting light that incides transversely in relation to the axial part (22*b*) of the prism once through approx. 90° and directing it towards the display surface (28*b*).

6. Control according to claim 4, characterized in that the light source is in the form of a ring (34*b*) with its central axis concentric with the rotational axis of the knob (12*b*).

7. Control, comprising a knob intended to be mounted in a wall element in such a way that it can rotate, with an external end facing towards the user and with a light-transmitting element in order to be able to display different symbols, depending upon the rotational position of the knob, by optical projection towards the external end, in addition to which the control comprises a disc element upon which symbols are arranged that are to be displayed at the external end of the knob, which disc element is located at the end of the knob facing away from the external end and concentric with this, and a light source that is located on the side of the disc element facing away from the knob in order to illuminate the symbol on the disc element that is to be displayed at the external end of the knob at the time, characterized in that the disc element upon which the symbols are arranged is stationary, in that the light-transmitting medium comprises a prism that has an axial part that is concentric with the rotational axis of the knob, the external end of which forms a symbol display surface, and a part arranged at an angle to the axial part with an internal end for receiving incident light from the illuminated symbol on the disc element that is to be projected towards the display surface at the time, with both parts of the prism being designed to refract the incident light towards the display surface, in that the prism itself is designed as a knob provided with a part that can be held and with a surface that prevents the leakage of light between the internal and external ends of the prism, and in that the light source is arranged to illuminate the symbol on the stationary disc element that is to be displayed on the display surface independent of the rotational position of the knob.

* * * * *